F. S. FRASER.
HARVESTING MACHINERY.
APPLICATION FILED MAR. 22, 1915.
1,204,557.
Patented Nov. 14, 1916.
2 SHEETS—SHEET 1.
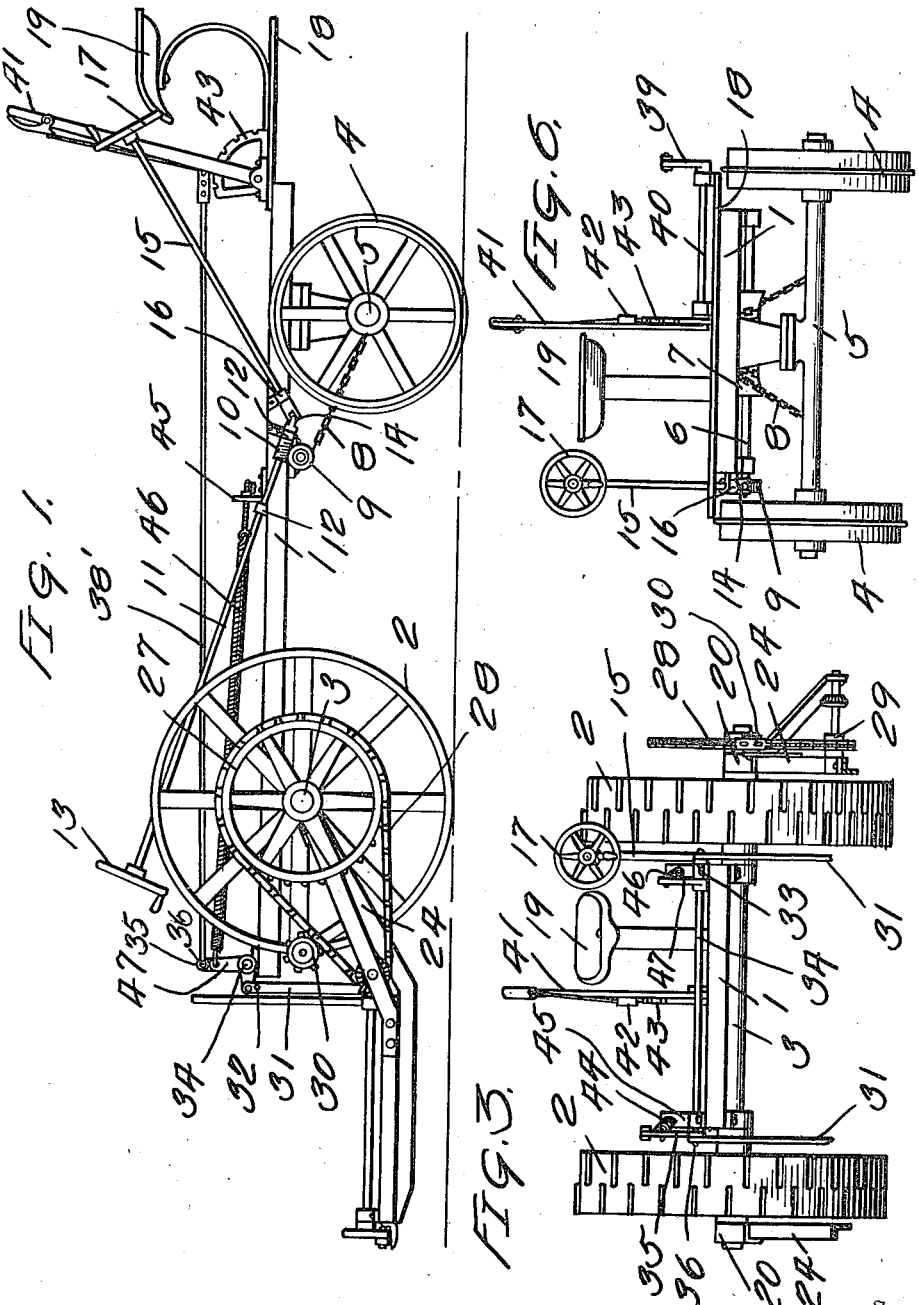

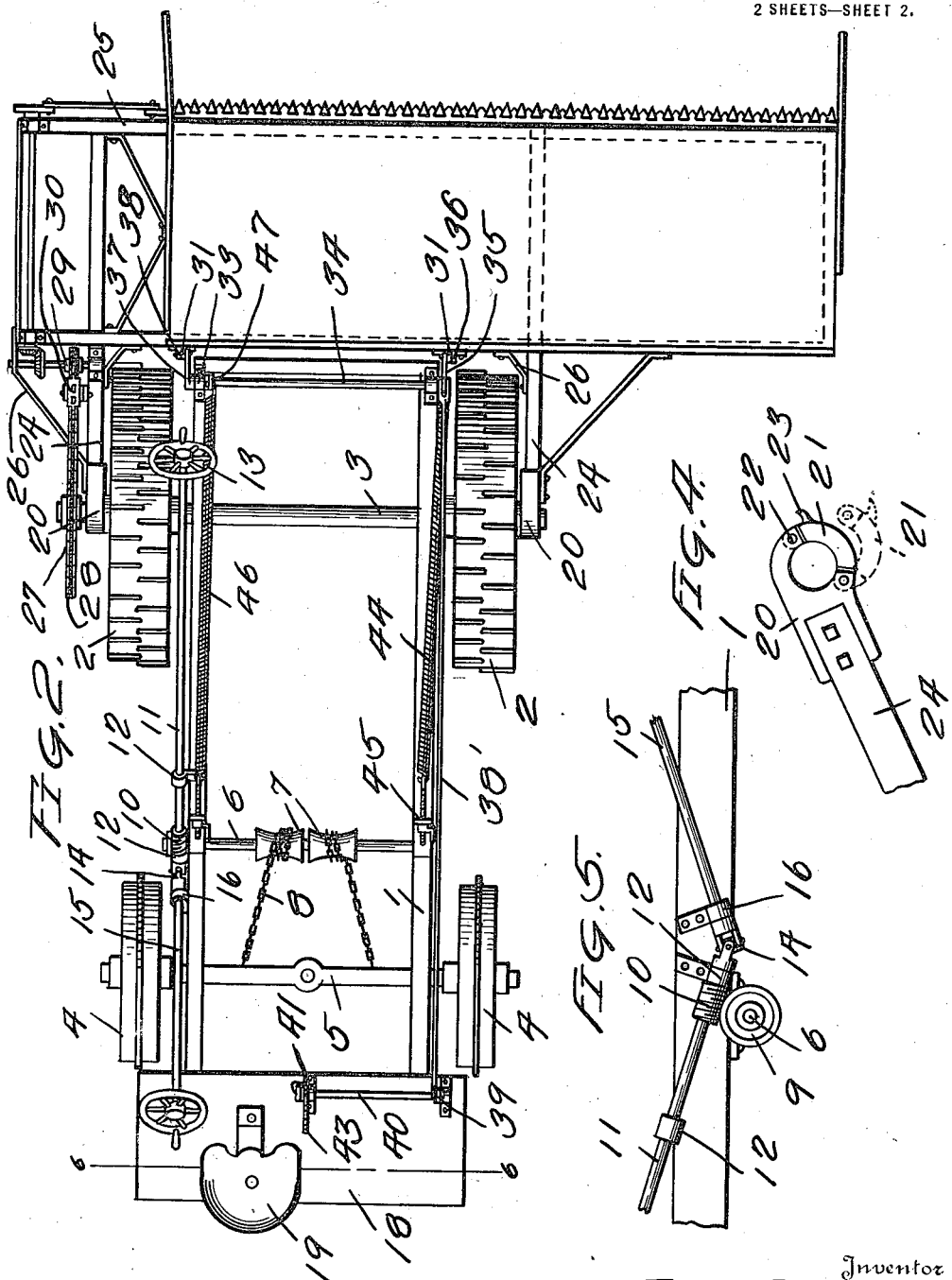

UNITED STATES PATENT OFFICE.

FRED S. FRASER, OF CHELSEA, OKLAHOMA.

HARVESTING MACHINERY.

1,204,557.  Specification of Letters Patent.  Patented Nov. 14, 1916.

Application filed March 22, 1915. Serial No. 16,235.

*To all whom it may concern:*

Be it known that I, FRED S. FRASER, a citizen of the United States, residing at Chelsea, in the county of Rogers, State of Oklahoma, have invented certain new and useful Improvements in Harvesting Machinery; and I do hereby declare the following to be a full, clear, and exact description of the invention, such as will enable others skilled in the art to which it appertains to make and use the same.

This invention relates to new and useful improvements in harvesting machinery.

An object of the invention resides in the attachment of a header or binder to a tractor.

A further object of the invention resides in so attaching the header or binder to the tractor that supplemental supporting means will be unnecessary.

A further object of the invention resides in the provision in the tractor of means for steering the same from either the front or rear end thereof.

A further object of the invention resides in detachably mounting the header or binder upon the tractor so that the said header or binder may be removed and the tractor used as such.

With these and other objects in view, such as will appear as the description progresses, my invention comprises the combination and arrangement of parts as set forth in and falling within the scope of the appended claims.

Referring to the drawing: Figure 1 is a side elevation of a machine constructed in accordance with my invention. Fig. 2 is a plan view thereof. Fig. 3 is a fragmental sectional view taken through the harvester frame, showing the means for adjusting the harvesting unit. Fig. 4 is a fragmental detail, showing the means for clamping the harvesting unit to the axle of the tractor. Fig. 5 is a fragmental detail, showing the manner of securing the steering rods together. Fig. 6 is a fragmental sectional view on line 6—6 of Fig. 2.

Referring to the drawing wherein like parts are indicated by like characters throughout the several views: In the embodiment of my invention shown in the drawings, I have provided a tractor which consists of a frame 1 supported by drive wheels 2 which are secured to an axle 3 rotatably mounted in the frame. The rear end of the frame 1 is supported by steering wheels 4 which are rotatably mounted on a swiveled axle 5. This tractor may be driven by any suitable motive power.

In order that the tractor may be steered from either the front or rear end, I have mounted, rotatably, on the frame 1 a transversely extending shaft 6 having a drum 7 thereon on which a chain 8 is wound, the ends of which chain are secured to the axle 5 so that upon the rotation of the shaft 6 in one direction the axle 5 will be turned in one direction, while upon the rotation of the shaft 6 in the other direction the axle will be turned in the opposite direction. Secured to one end of this shaft 6 is a worm gear 9 and meshing with this gear is a worm 10 formed on a steering rod 11 which is rotatably mounted in bearings 12 and extends toward the front of the tractor. On the end of this rod is a steering wheel 13. Thus upon the rotation of the rod 11 the shaft 6 will be turned in either one direction or the other and the tractor steered. Secured to the end of the rod 11 by means of a universal joint 14 is a second steering rod 15 which is rotatably mounted in bearings 16 and extends toward the rear end of the tractor. This rod 15 is provided with a steering wheel 17. Adjacent each of the steering wheels 13 and 17 is a platform 18 on which the operator may stand, the platform adjacent the rearward end of the tractor being provided with a seat 19 for the convenience of the operator.

Loosely mounted on the extended ends of the axle 3 are castings 20 to which the frame of the harvesting unit is secured. Each casting is provided with a pivoted tongue 21 which is adapted to swing over the axle and be secured to the complemental portion of the casting by a bolt 22. For convenience of operation, the tongues 21 are provided with handles 23. Secured to these castings 20 are arms 24 of the frame 25 of the harvesting unit, to which arms braces 26 are secured, which are, at their other ends, secured to the frame 25. This harvesting unit may be either a header or binder.

In order that the mechanism of the harvesting unit may be actuated by the tractor, I have provided one of the wheels 2 with a sprocket 27 over which a chain 28 passes, which chain also passes over a suitable sprocket 29 on the harvesting unit. This chain is kept taut by an idler 30 secured to the adjacent arm 24.

In order that the frame 25 of the harvesting unit and consequently the unit itself may be raised or lowered about the axle 3 as a pivot, I have provided a pair of upwardly extending links 31 which are secured to the frame of the harvesting unit and are provided with a plurality of holes 32 adjacent their upper ends. Rotatably mounted in bearings 33 on the frame 1 of the tractor is a shaft 34 which has a bell crank lever 35 formed on one end thereof. One arm of the said mentioned bell crank lever is secured to the adjacent link 31 by a bolt 36 which passes through the arm and through one of the holes 32 in the link 31. On the other end of this shaft 34 is a lever 37 which is secured to the adjacent link 31 by a bolt 38 passing through the lever and through one of the holes in the link 31. In order that this shaft 34 may be partially rotated so as to raise or lower the harvesting unit, I have secured to the bell crank lever 35 a rod 38' which is adjustably secured at its other end to an arm 39 formed on a shaft 40, which shaft is rotatably mounted on the frame 1 of the tractor adjacent the forward end thereof. The movement of this shaft 40 is controlled by a lever 41 which is formed on the shaft and the position of which is controlled by the coöperation of a pawl 42 with a quadrant rack 43. Thus when the lever 41 is moved in one direction the harvesting unit will be allowed to lower about the axle 3 as a pivot and when the lever is moved in the other direction the harvesting unit will be raised. In order that the raising of the said harvesting unit may be assisted, I have provided a coil spring 44 which is connected to the vertical arm of the bell crank lever 35, extends rearwardly and is secured to the frame 1, as at 45. A second and similar spring 46 is secured to the opposite side of the frame 1 and to an arm 47 on the shaft 34.

It will be seen that the harvesting unit may be secured to the tractor in the manner described and the steering wheel 17 used to steer the tractor, the wheels 2 being at this time used as the advance wheels of the tractor. Now when it is desired to use the tractor as such, a suitable truck may be placed beneath the harvesting unit and the said unit detached from the tractor by the withdrawal of the bolts 36 and 22. When the tractor is used as such the wheels 4 will be the advance wheels and the steering wheel 13 used to steer the tractor.

From the foregoing description it will be seen that I have provided a tractor to which a harvesting unit is detachably and adjustably secured, which unit is entirely supported by the tractor and needs no supplemental supporting means.

I have provided steering mechanism by means of which the tractor may be steered from either end.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In a device of the class described, a tractor, a shaft rotatably mounted on the tractor between the ends thereof and having a worm gear thereon, means connecting the shaft and the front axle of the tractor to turn the latter upon the rotation of the shaft, a steering rod having a worm thereon engaging the worm gear, extending to the rear of the tractor, a second steering rod extending to the front of the tractor and having its end terminating adjacent the worm gear and the end of the first mentioned rod and a universal joint connecting the adjacent ends of the rods together.

2. In combination with a vehicle having a guiding axle pivoted intermediate its ends, of a shaft mounted on said vehicle adjacent said axle, drums on said shaft, a worm gear on said shaft, a steering rod mounted for rotation on said vehicle and terminating at one end adjacent said gear and at its opposite end adjacent one end of said vehicle, a worm gear on said rod engaged with said gear, a second steering rod, a universal joint connecting the adjacent ends of said rod and the second rod terminating at its opposite end adjacent the opposite end of said vehicle, and chains connected to said drums and to said steering axle on opposite sides of its pivotal connection.

In testimony whereof, I affix my signature, in the presence of two witnesses.

FRED S. FRASER.

Witnesses:
CHARLIE MILAM,
J. B. PARKS.